United States Patent
Houston

(10) Patent No.: US 9,167,748 B1
(45) Date of Patent: Oct. 27, 2015

(54) SULKY APPARATUS

(71) Applicant: Steve R. Houston, Germantown, MD (US)

(72) Inventor: Steve R. Houston, Germantown, MD (US)

( * ) Notice: Subject to any disclaimer, the term of this patent is extended or adjusted under 35 U.S.C. 154(b) by 0 days.

(21) Appl. No.: 14/121,510

(22) Filed: Sep. 15, 2014

(51) Int. Cl.
| B62D 51/02 | (2006.01) |
| A01D 34/00 | (2006.01) |
| B62D 47/00 | (2006.01) |

(52) U.S. Cl.
CPC ............. *A01D 34/001* (2013.01); *B62D 47/00* (2013.01)

(58) Field of Classification Search
CPC ........ B62K 25/02; B62K 25/04; B62K 3/002; B62D 51/02; B62D 47/00; B62B 5/087; A01D 34/001; B60B 29/00; B60B 29/001
USPC ................. 280/32.7, 760; 301/111.05, 111.06
See application file for complete search history.

(56) References Cited

U.S. PATENT DOCUMENTS

| 5,004,251 | A  | * | 4/1991  | Velke et al. ................... 280/32.7 |
| 5,983,614 | A  | * | 11/1999 | Hancock et al. ............... 56/16.7 |
| 6,485,036 | B1 | * | 11/2002 | Bricko ........................ 280/32.7 |
| 6,692,010 | B1 | * | 2/2004  | Johnson et al. ............... 280/32.7 |
| 7,527,285 | B2 | * | 5/2009  | Vachal .......................... 280/657 |
| 2005/0126146 | A1 | * | 6/2005 | Velke et al. .................... 56/16.7 |
| 2014/0203531 | A1 | * | 7/2014 | Huang .................... 280/124.116 |

* cited by examiner

Primary Examiner — John Walters
Assistant Examiner — Brian Swenson
(74) Attorney, Agent, or Firm — Michael W. York

(57) ABSTRACT

Sulky apparatus including an operator standing platform, a tire and associated wheel rim for allowing the operator standing platform to move along the ground, a wheel well associated with the operator standing platform for housing the wheel rim and tire in an operational position, a tire axle having two end portions located in the center of the wheel rim, the two end portions being configured to rest in the bottoms of depressions located in the walls of the wheel well, a pivoting U-shaped axle locking member located at the top of the wheel well where the locking member can engage the upper surfaces of the end portions of the axle and secure the axle and the associated tire in the operational position in the wheel well, a pivotal cover covering the wheel well for allowing access to the wheel well and locking means associated with the wheel well and the cover for locking the pivoting U-shaped axle locking member and the cover in place in their operational positions. When the locking means is unlocked, it permits the pivotal wheel cover to be pivoted upward and forward and the pivoting U-shaped axle locking member to also be pivoted upward and forward and this allows the tire and the associated wheel rim to be removed from the wheel well.

7 Claims, 5 Drawing Sheets

SULKY APPARATUS

BACKGROUND OF THE INVENTION

Sulky apparatus for use with self-propelled machinery such as self-propelled lawn mowers have been in use for sometime and they allow the operator of self-propelled machinery to operate the machinery much more efficiently and allow much more to be accomplished with the machinery than was possible prior to such sulky apparatus. Typically, the sulky apparatus included a platform for the operator to stand upon and some type of boom that was attached to the operator platform at one end and to the self-propelled machinery at the other end of the boom. Examples of such a sulky apparatus are set forth in U.S. Pat. No. 5,575,140 and in U.S. Pat. No. 7,527,285.

Typically, a sulky will have a rubber tire that is inflated by air and like all such tires it is subject to punctures and leaks. When a puncture or leak occurs that causes the sulky tire to go flat, it causes a major disruption in the use of the equipment that is attached to the sulky until the tire is repaired or replaced. Unfortunately, with current sulkies changing a tire is very time consuming and is difficult to accomplish. The sulky must first be disconnected from the equipment such as a lawnmower and then the sulky must be turned over so that the wheel faces upward and then the axle and associated structure must be disassembled so that the sulky tire can be removed from its position in the sulky wheel well or fender. This requires tools as well as time and skill.

The tire must then be replaced and the new tire and the axle and associated structure that was disassembled must then be reassembled and then the sulky must be reconnected to the equipment it is being used with. This whole operation is very difficult and is very time consuming. It is even more so if there is no replacement tire and the original tire must be repaired. Consequently, a tire that needs to be replaced on a sulky that is being used is a major event that can have a very negative impact on the operator's work schedule. It is even worse if the tools necessary for the tire replacement or a replacement tire are not readily available. The same is true if the operator does not have the skill or instructions necessary to replace the tire or to repair and replace the tire.

The present sulky apparatus invention overcomes these deficiencies present in the prior art sulky apparatus and provides sulky apparatus that allows the operator to have a sulky apparatus with a sulky apparatus riding platform that allows the operator to have ready access to the sulky tire from the top of the sulky and consequently is able to operate the present sulky apparatus invention in a much more efficient and productive manner.

SUMMARY OF THE INVENTION

This invention relates to sulky apparatus and more particularly to improved sulky apparatus that allows the operator of the sulky apparatus to change the sulky tire without inverting the sulky.

It is accordingly an object of the present invention to provide sulky apparatus that allows the sulky operator to change the sulky wheel rim and tire without having to disconnect the sulky from any attached equipment.

It is an object of the present invention to provide sulky apparatus that allows the operator of the sulky apparatus to change the sulky tire without any tools.

It is an object of the present invention to provide sulky apparatus that allows the operator of the sulky apparatus to rapidly change the sulky tire.

It is an object of the present invention to provide sulky apparatus that allows the operator of the sulky apparatus to change the sulky tire without any instructions.

It is an object of the present invention to provide sulky apparatus that allows the operator of the sulky apparatus to change the sulky tire without any skill.

It is an object of the present invention to provide sulky apparatus that allows the operator of the sulky apparatus to readily inspect the sulky tire without removing the tire from the sulky.

It is an object of the present invention to provide sulky apparatus that allows the operator of the sulky apparatus to readily grease the axle without removing the tire and wheel rim from the sulky.

It is an object of the present invention to provide sulky apparatus that allows the operator of the sulky apparatus to readily inflate the sulky tire without removing the tire from the sulky.

It is an object of the present invention to provide sulky apparatus that allows the operator of the sulky apparatus to service the sulky tire and wheel well to remove mud and the like without removing the tire from the sulky.

It is an object of the present invention to provide sulky apparatus adapted to be used with multiple types of self-propelled machines.

It is an object of the present invention to provide sulky apparatus that is easy to operate by the operator of the sulky apparatus.

It is an object of the present invention to provide sulky apparatus that is safer to use due to improved access and maintenance.

It is an object of the present invention to provide sulky apparatus that is easy to service.

It is an object of the present invention to provide sulky apparatus that is easy to disassemble.

It is an object of the present invention to provide sulky apparatus that is easy to repair.

These and other objects of the invention will be apparent from the following described sulky apparatus invention that includes an operator standing platform, a tire and associated wheel rim for allowing the operator standing platform to move along the ground, a wheel well associated with the operator standing platform for housing the tire and associated wheel rim in an operational position, a tire axle having two end portions located in the center of the wheel rim, the two end portions being configured to rest in the bottoms of depressions or cut out portions located in the upper side walls of the wheel well, a pivoting U-shaped axle locking member located at the top of the wheel well where the locking member can engage the upper notched surfaces of the end portions of the axle and secure the axle and the associated tire and wheel rim in the operational position in the wheel well, a pivotal wheel cover covering the wheel well for allowing access to the wheel well and locking means associated with the wheel well and the wheel cover for locking the pivoting U-shaped axle locking member and the cover in place in their operational positions.

BRIEF DESCRIPTION OF THE DRAWINGS

The invention will be hereinafter more completely described with reference to the accompanying drawings in which.

DETAILED DESCRIPTION OF THE PREFERRED EMBODIMENT

Figure 1:
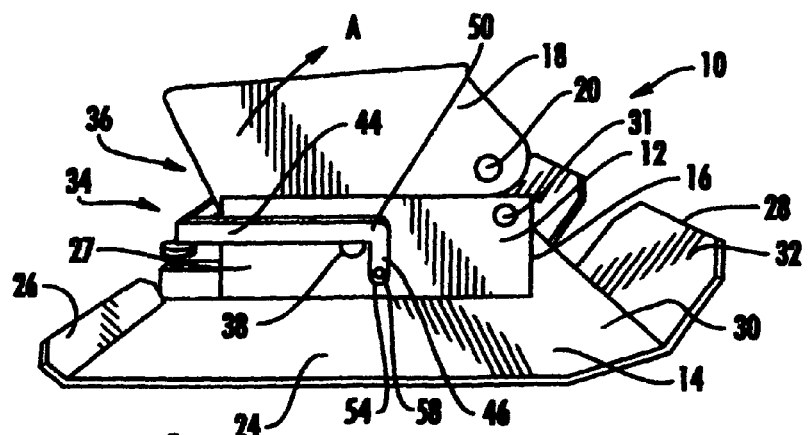
FIG. 1 is a right side perspective view of the sulky apparatus invention.
Figure 2:
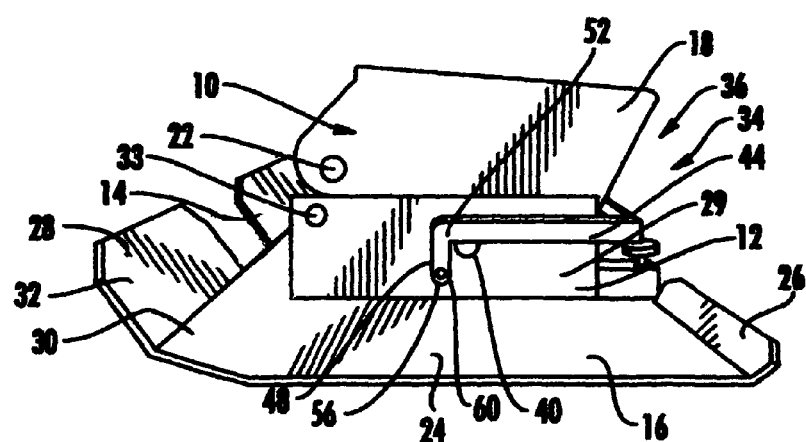
FIG. 2 is a left side perspective view of the sulky apparatus invention.
Figure 3:
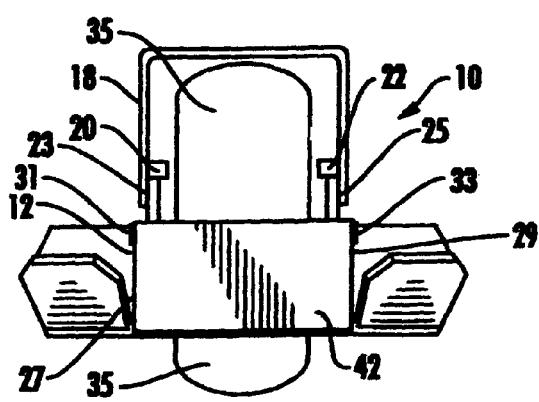
FIG. 3 is a front perspective view of the sulky invention with certain portions thereof broken away.

Referring first to FIGS. 1 through 5, the sulky apparatus invention is illustrated and is designated generally by the number 10. As illustrated, the sulky apparatus invention 10 includes a generally rectangular hollow wheel well housing 12 with substantially identical generally rectangular shaped operator standing supports 14 and 16 extending outward from the wheel well housing 12. The top of the wheel well housing 12 is covered by a generally rectangular shaped inverted U-shaped cross section wheel cover 18 that as illustrated in FIG. 3 has means for permitting the wheel cover 18 to open to gain access to the interior of the wheel well housing 12 that allows the cover 18 to be manually pivoted forward that includes the pivot pins or pivot connectors 20 and 22 that connect the forward lower portions of the cover to the adjacent right and left walls 27 and 29 of the wheel well housing 12 through upward extending respective extensions 23 and 25 that are connected to the right and left walls 27 and 29 of the wheel well housing 12 by the respective fasteners 31 and 33. These pivot pins 20 and 22 permit the wheel cover 18 to be manually pivoted upward and forward as illustrated by the arrow A in FIG. 1. FIG. 3 also shows a tire 35 in the normal operational position in the wheel well housing 12 and being covered by the rotating wheel cover 18.

The standing supports 14 and 16 are substantially identical and have a central substantially flat portion 24 with a small upward slanting lip 26 at the rear portion. The forward portion of the standing supports 14 and 16 have an upward slanting lip 28 that includes two progressively upward slanting portions 30 and 32. Wheel locking means designated generally by the number 34 is located at the rear of the wheel well housing 12 and adjacent to each side wall 27 and 29 of the wheel housing 12. Wheel cover locking means that is designated generally by the number 36 for locking the wheel cover 18 in the closed position is also located at the rear of the wheel well housing 12. As illustrated In FIGS. 1 and 2, right and left axle end portions 38 and 40 of the wheel axle extend outside the respective right and left walls 27 and 29 of the wheel well housing 12 and as illustrated in FIG. 3, the forward portion of the wheel well housing 12 has a solid wall 42 that adds strength to the wheel well housing 12.

Figure 4:
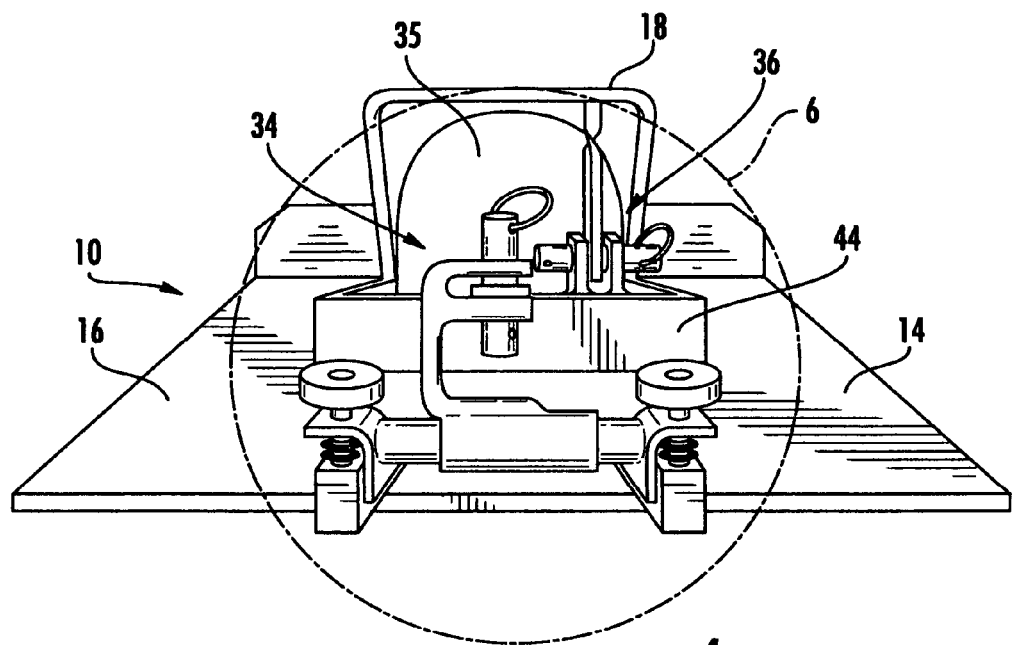
FIG. 4 is a rear perspective view of the sulky invention.
Figure 5:
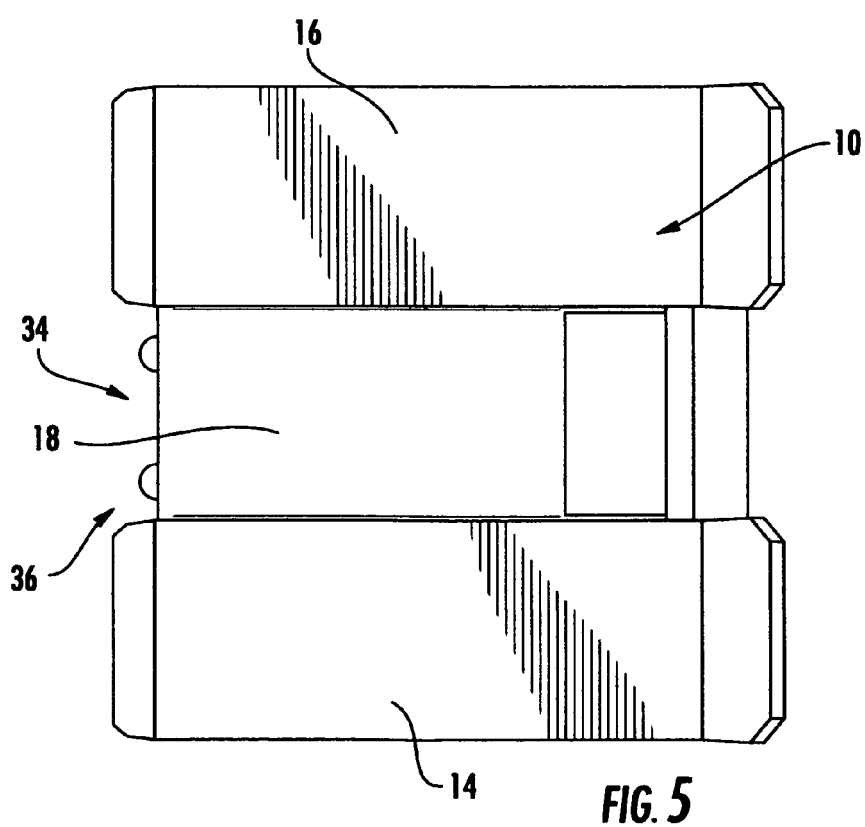
FIG. 5 is a top plan view of the sulky invention.
Figure 6:
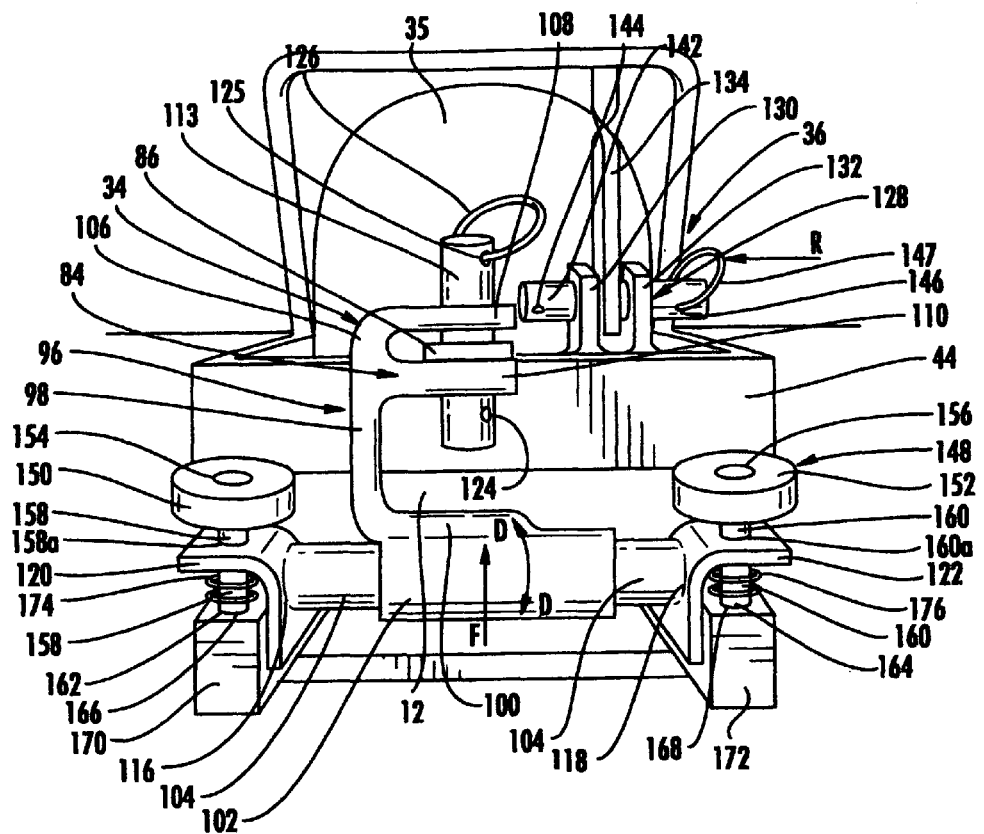
FIG. 6 is an enlarged perspective view with certain portions removed of a portion of a wheel axle and wheel cover locking systems for the sulky apparatus invention that are located within the circle 6 in FIG. 4.

The details of the wheel locking means that is designated generally by the number 34 and a wheel cover locking means that is designated generally by the number 36 are illustrated in FIG. 6 which is an is an enlarged perspective view with certain portions omitted of the wheel locking means 34 and the wheel cover locking means 36 for the sulky apparatus invention 10 that are located within the circle 6 in FIG. 4 which is a rear perspective view of the sulky invention 10. The wheel axle locking means 34 includes a U-shaped locking member 44 that has respective substantially identical downward projections 46 and 48 that as illustrated in FIGS. 1 and 2 project downwardly at substantially ninety degrees from the respective right and left end portions 50 and 52 of the U-shaped locking member 44. The lower end portions 54 and 56 of the respective downward projections 46 and 48 are rotatably connected to the respective right and left side walls 27 and 29 of the wheel well housing 12 by the respective bolts 58 and 60. As a consequence, the U-shaped locking member 44 can be pivoted upwardly and forwardly once the wheel cover 18 has been pivoted upwardly and forward as illustrated by the arrow A in FIG. 1 and the U-shaped locking member 44 is unlocked in a manner that will hereinafter be described in detail.

Figure 8:
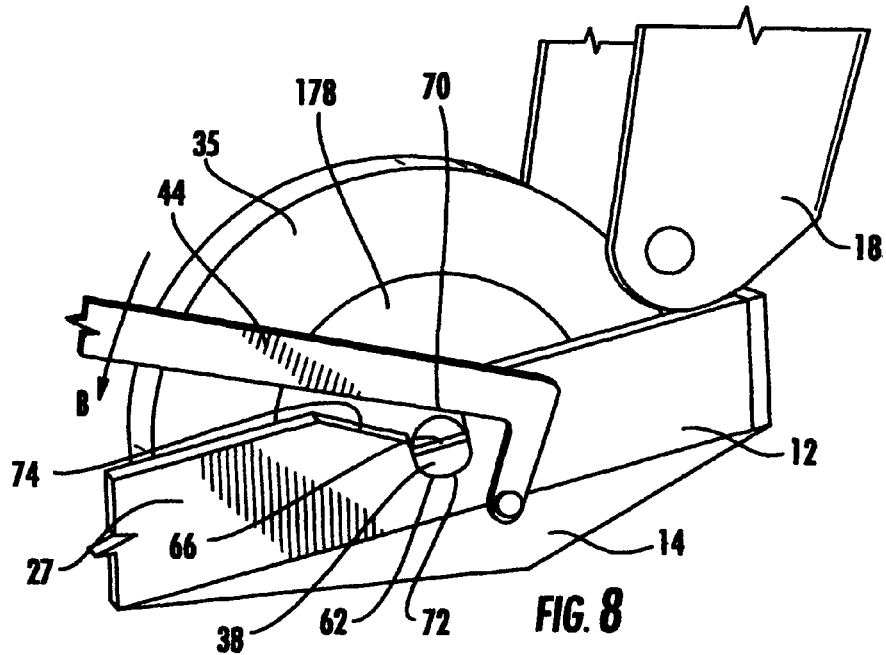
FIG. 8 is an enlarged perspective side elevational view of a portion of the sulky apparatus invention illustrated in FIG. 1 with the wheel cover open illustrating a portion of the wheel axle locking structure of the sulky apparatus invention.
Figure 9:
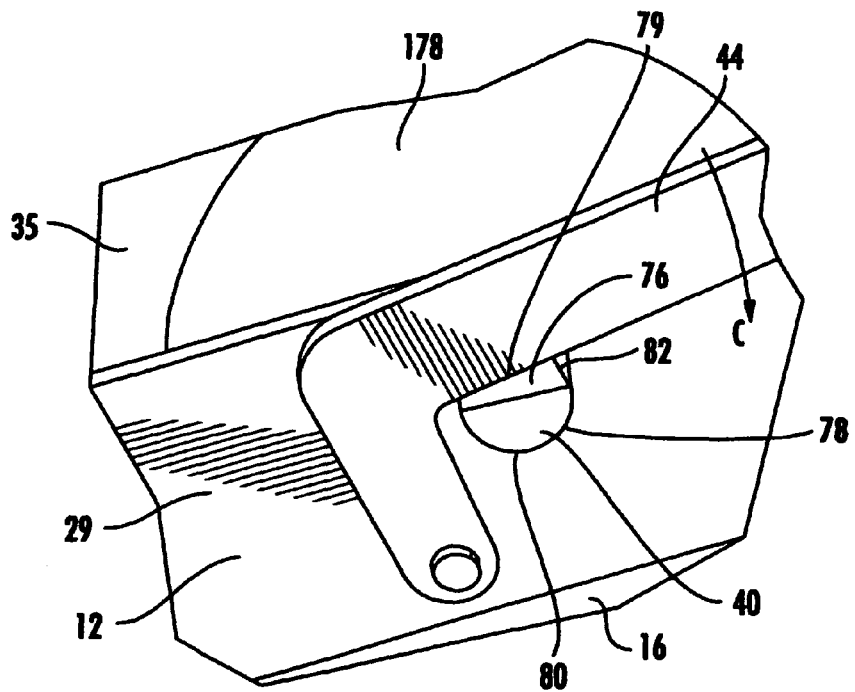
FIG. 9 is an enlarged perspective side elevational view of a portion of the sulky apparatus invention illustrated in FIG. 2 with the wheel cover open illustrating a portion of the wheel axle locking structure of the sulky apparatus invention.
Figure 10:
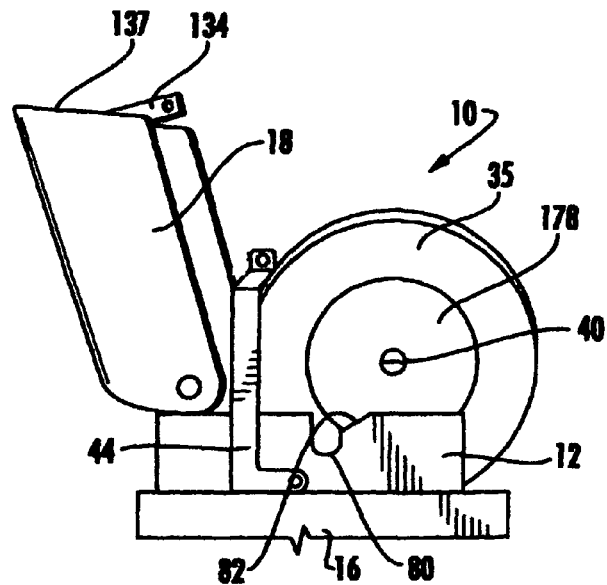
FIG. 10 is a left perspective view of the sulky invention with portions thereof broken away showing the tire and wheel rim being removed from the sulky or the replacement of the sulky tire and wheel rim.

The details of how the U-shaped locking member 44 interacts with the right and left axle end portions 38 and 40 are illustrated in FIGS. 8, 9 and 10. As indicated in FIG. 8, the right axle end portion 38 is illustrated and it will be noted that this right axle end portion 38 has an upper flat surface 66 that is located to be engaged by the adjacent surface 70 of the locking member 44 when the locking member 44 is moved in the direction of the arrow B. It will be noted that the lower surface 62 of the right axle end portion 38 rests in a substantially matching half circular depression 72 that is located at the bottom of a triangular cut out portion 74 in a portion of the top of the right side wall 27 of the wheel well housing 12.

FIG. 9 illustrates the left axle end portion 40 and associated structure that is substantially a mirror image of right axle end portion 38 and the associated structure that was just described. In this connection, it will be noted that this left axle end portion 40 is substantially identical to the right axle end portion 38 and the left axle end portion 40 has an upper flat surface 76 that is substantially identical to the right axle end portion flat surface 66. This flat surface 76 is also located to be engaged by the adjacent surface 79 of the locking member 44 in a manner identical to that for the adjacent surface 70 in FIG. 8. It will also be noted that the lower surface of the left axle end portion 40 rests in a substantially matching half circular depression 80 that is located at the bottom of a triangular cut out portion 82 in the a portion of the top of the left side wall 29 of the wheel well housing 12 in a manner identical to that described with respect to the substantially identical structure designated by the numbers 38, 72 and 74 associated with FIG. 8 and the right axle end portion 38 and associated structure. As illustrated in FIGS. 8 and 9, when the axle locking member 44 is pivoted downwardly as indicated by the respective arrows B and C in the respective FIGS. 8 and 9, the respective surfaces 70 and 79 of the axle locking member 44 will contact the respective surfaces 66 and 76 of the right and left axle end portions 38 and 40 and hold these axle end portions 38 and 40 in the respective half circular depressions 72 and 80. When the respective surfaces 70 and 79 of the axle locking member 44 contact the respective surfaces 66 and 76 of the right and left axle end portions 38 and 40 and hold these axle end portions 38 and 40 in the respective half circular depressions 72 and 80, the locking member 44 will be in the substantially horizontal position illustrated in FIGS. 1 and 2. When this occurs, the axle end portions 38 and 40 are secured in the respective half circular depressions 72 and 80 in the respective sides 27 and 29 of the wheel well 12 and this secures the associated wheel rim 178 and the tire 35 in the wheel well 12.

Figure 7:
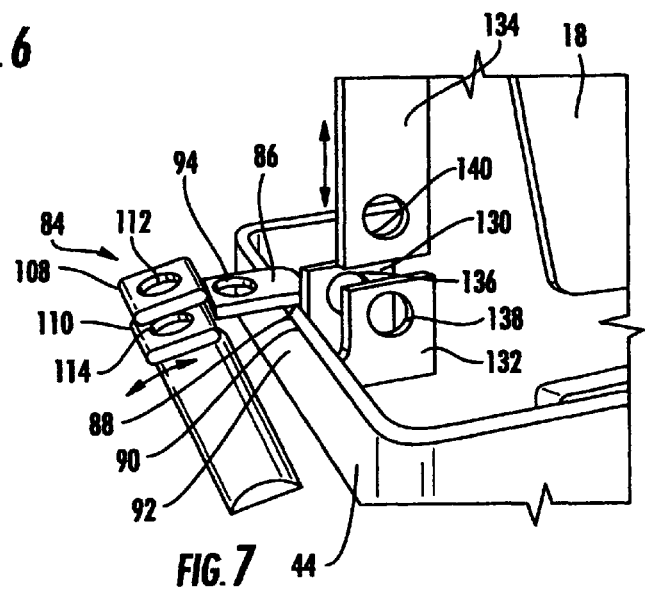
FIG. 7 is an enlarged perspective view with certain portions removed or broken away of the locking systems for the sulky apparatus invention shown in FIG. 6 taken from the right side of the structure illustrated in FIG. 6 taken in the direction of the arrow R with the locking pins removed to illustrate the locking systems in their open unlocked positions.

The wheel locking means 34 that includes the axle locking member 44 also has the locking apparatus illustrated in FIGS. 6 and 7 that is designated by the number 84 that is connected to the rear end portion of the U-shaped locking member 44 and prevents the U-shaped locking member 44 from being pivoted upwardly until it is unlocked in a manner that will hereinafter be described in detail. The locking apparatus 84 includes a generally rectangular shaped locking member 86 that as illustrated in FIG. 7 has its rear surface 88 rigidly connected to the upper surface 90 locking member 44 by being welded or the like so that the locking member 86 projects outwardly from the adjacent outer surface 92 of the locking member 44 at substantially a ninety degree angle. This rectangular shaped locking member 86 has a circular hole 94 extending through it as illustrated in FIG. 7.

As illustrated in FIG. 6, another locking member 96 is configured to function with locking member 86. The locking member 96 has a generally C-shaped portion 98 that is welded at its lower end 100 to a hollow cylinder 102 that rotates around a circular cross section rod 104 as indicated by the double ended arrow D in FIG. 6. The upper end 106 of the C-shaped portion 98 has two spaced apart projecting portions 108 and 110 that are sized, shaped and located to be capable of being located above and below the rectangular shaped locking tab member 86 that is connected to the locking member 44 when the locking member 96 is rotated upward as illustrated in FIG. 6. As illustrated in FIG. 7, the spaced apart projecting portions 108 and 110 have respective circular shaped holes 112 and 114 extending through them that are basically the same size as the hole 94 in the locking member 86. Since these holes 112, 114 and 94 are basically the same size, when the locking member 96 is rotated upward about the rod 104, a cylindrical pin 113 that is slightly smaller in diameter than the holes 112, 114 and 94 can be inserted into these holes 112, 114 and 94 as illustrated in FIG. 6.

When the pin 113 is inserted into the holes 112, 114 and 94 it prevents the locking member 96 from being separated from the locking tab member 86 that is fastened to the locking member 44. Since the respective left and right ends 116 and 118 of the rod 104 are respectively connected by welding or the like to respective left and right rod supports 120 and 122 and these rod supports 120 and 122 are connected to the wheel housing through an adjusting system that will hereinafter be described in detail that in turn are connected to the wheel housing, the inserted pin 113 prevents the locking member 44 from being moved upwardly from around the wheel housing 12. It will be noted that the pin 113 has a spring loaded ball 124 near its end to assist in retaining the pin 113 in the holes 112, 114 and 94 and a small hole 125 and a ring is 126 located in the hole 125 so that a finger can be inserted into the ring 126 to assist in the manual removal of the pin 113 from the holes 112, 114 and 94.

A wheel cover locking apparatus that is part of the wheel cover locking means 36 is designated generally by the number 128 is also illustrated in FIG. 6. As illustrated, this wheel cover locking apparatus 128 is located adjacent to the previously described locking apparatus 84 and the wheel cover locking apparatus 128 includes two spaced apart rectangular flat members 130 and 132 that are welded to the upper portion 90 of the locking member 44 so that they project upwardly from upper portion 90 of the locking member 44. These spaced apart rectangular flat members 130 and 132 are spaced apart enough to accept a downward depending rectangular member 134 that projects downwardly from the forward portion 137 of the wheel cover 18 as illustrated in FIG. 10. As illustrated in FIG. 7, the members 130 and 132 and 134 have substantially identically sized holes 136, 138 and 140 that extend through them. These holes 136, 138 and 140 also have the same size as the previously described holes 112, 114 and 94. As indicated in FIG. 6, a cylindrical pin 142 is provided that is sized to fit into the holes 136, 138 and 140. This pin 142 is substantially the same as the previously described pin 113. It will be noted that the pin 142 has a spring loaded ball 144 near it's end to assist in retaining it in the holes 136, 138 and 140 and a small hole 146 and a ring 147 that is located in the hole 146 are located in the outer end portion of the pin 142 so that a finger can be inserted into the ring 147 to assist in the manual removal of the pin 142 from the holes 136, 138 and 140. When the pin 142 is inserted into the holes 136 and 138 of the members 130 and 132 and the hole 140 in the adjacent downward depending member 134, this locks the members 130 and 132 to the member 134 that projects downwardly from the forward portion 137 of the wheel cover 18. As a consequence, the wheel cover 18 is secured to the locking member 44 and if the pin 113 is also inserted into the holes 112, 114 and 94, which prevents the locking apparatus 96 from being separated from the locking tab member 86 that is fastened to the locking member 44, the wheel cover 18 can not be pivoted upward until the pin 142 is removed.

An adjusting system that is designated generally by the number 148 is illustrated in FIG. 6. The adjusting system 148 comprises two handles 150 and 152 that are rigidly secured to the upper portions 154 and 156 of downwardly extending shafts 158 and 160 whose lower end portions 162 and 164 are threaded into threaded holes 166 and 168 in substantially identical adjustment blocks 170 and 172 that are rigidly fixed to the wheel well 12 by welding or the like. The shafts 158 and 160 have respective enlarged upper end portions 158a and 160a whose lower end surfaces contact and press against the upper surfaces of the respective supports 120 and 122. Substantially identical coil springs 174 and 176 are located around the respective shafts 158 and 160 between the respective supports 120 and 122 and the adjustment blocks 170 and 172. This upward spring force represented by the arrow F in FIG. 6 positions the supports 120 and 122 and the structure connected directly or indirectly to the supports 120 and 122 that is located above the adjustment blocks 170 and 172 subject to the position of the handles 150 and 152 and the associated respective enlarged shaft portions 158a and 160a as illustrated in FIG. 6. The positions of the supports 120 and 122 can be varied by manually turning the respective handles 150 and 152. By using these handles 150 and 152 and the associated connected structure including the upper portions 154 and 156 of downwardly extending shafts 158 and 160 whose lower end portions 162 and 164 are threaded into threaded holes 166 and 168 in substantially identical adjustment blocks 170 and 172 that are rigidly fixed to the wheel well 12, the operator can adjust the position of the structure illustrated in FIG. 6 above the adjustment blocks 170 and 172 to compensate for wear between the pin 113 and the surrounding holes 112, 114 and 94 and/or the pin 142 and the surrounding holes 136, 138 and 140. The handles 150 and 152 can be used to adjust for any other wear between other moving parts such as that between the half round or half circular depressions 72 and 80 in the side walls 27 and 29 of the wheel well 12 and the axle end portions 38 and 40 and wear on the flat contact surfaces 66 and 76 and the adjacent surfaces 70 and 79 illustrated in FIGS. 8 and 9.

The sulky apparatus invention 10 is used in the following manner. FIGS. 1 through 5 illustrate how the sulky apparatus 10 is configured for normal use. During normal use it frequently happens that tire 35 and also the associated tire rim 178 needs to be serviced. With prior art sulkies, servicing the tire 35 and/or wheel rim 178 is difficult and time consuming since it is difficult to gain access to the tire and wheel rim of such prior art sulkies. Basically, this required that the sulky be inverted and that the tire and wheel rim be removed from the bottom of the sulky. With the sulky apparatus invention 10, the sulky no longer needs to be inverted since access to the tire 35 and associated wheel rim 178 is easily gained from the top of the sulky through the use of the sulky apparatus invention 10.

In order to gain access to the tire 35 and wheel rim 178, the operator merely inserts a finger into the loop 126 of the attached pin 113 that are located at the rear of the wheel housing 18 and then pulls upward to pull the pin 113 out of the surrounding holes 112, 114 and 94. This unlocks the locking member 96 and allows the release of the locking tab member 86 that is fastened to the locking member 44 so that the axle locking member 44 can be pivoted upwardly as illustrated in FIGS. 8 and 9 once the wheel cover 18 has been unlocked. The wheel cover 18 is unlocked by the operator inserting a finger into the loop 147 of the attached pin 142 that are also located at the rear of the wheel housing 18 and then pulling outward to pull the pin 142 out of the surrounding holes 136, 138 and 140. This unlocks the downward projecting rectangular member 134 and allows the wheel cover 18 to be pivoted upwardly as illustrated in FIGS. 8 and 10. In some instances, it may not be necessary to remove the tire 35 and the associated wheel rim 178 from the wheel well 12 such as to check the tire 35 air pressure or to add air to the tire 35. In this case, the operator will only unlock the wheel cover 18 in the previously described manner and pivot the wheel cover 18 upward to gain access to the tire 35 since removal of the tire 35 and the associated wheel rim 178 is not necessary. The operator can also use this same simple procedure of only unlocking the wheel cover 18 and pivoting it upwardly to gain access to the tire 35 and the inside of the wheel cover 18 to remove wet grass, mud, twigs and the like that may have accumulated during the operator's mowing operations.

Figure 11:
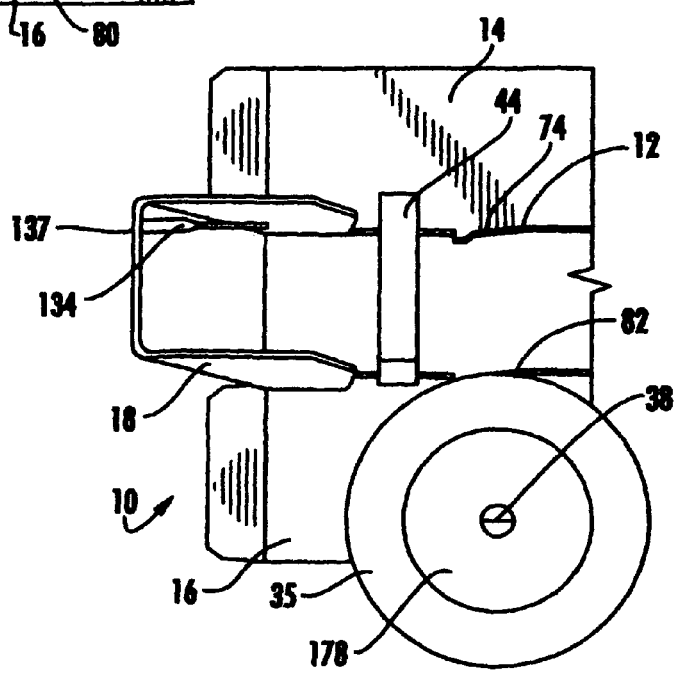
FIG. 11 is a top perspective view of the sulky invention with a portion thereof broken away or omitted showing the wheel cover open and the tire and wheel rim removed.

FIG. 10 illustrates how the tire 35 and associated wheel rim 178 is added or removed from the wheel well 12 of the sulky apparatus 10. As illustrated, the wheel cover 18 has been pivoted upwardly to the full upward position and also, the locking member 44 has been pivoted upwardly to the full upward position. Prior to doing this, the operator unlocked the wheel locking means 34 in the previously indicated manner. In addition, the operator unlocked the wheel cover locking apparatus 128 in the previously described manner. With the wheel cover 18 pivoted upwardly to the full upward position and the locking member 44 pivoted upwardly to the full upward position as illustrated in FIG. 10 there is no obstruction that would prevent removal of the tire 35 and associated wheel rim 178 from the wheel well 12 or prevent the insertion of the tire 35 and associated wheel rim 178 into the wheel well 12. FIG. 11 illustrates the tire 35 and associated wheel rim 178 completely removed from the wheel well 12 and readily illustrates how easy it is for an operator to insert a new or repaired tire 35 and associated wheel rim 178 into the interior of the wheel well 12 so that axle end portions 38 and 40 fit into the respective half circular depressions 72 and 80 at the bottom of the triangular shaped cut outs 74 and 82.

If for some reason the operator believes that the sulky apparatus 10 is not functioning satisfactory, the operator can use the adjusting system 148 to correct or compensate for the problem that could be caused by wear. For example, wear could occur between the pin 113 and the corresponding the holes 112, 114 and 94 and/or between pin 142 and the holes 136, 138 and 140 or between some other moving parts such as wear between the axle end portions 38 and 40 and the respective half circular depressions 72 and 80 at the bottom of the triangular shaped cut outs 74 and 82. In order to accomplish this, the operator will manually adjust the handles 150 and 152 in the previously described manner.

It will be appreciated that the sulky apparatus 10 described herein will have an associated conventional boom to attach the sulky apparatus 10 in a conventional manner to a piece of conventional machinery that will tow the sulky apparatus 10. However, since such a boom is well known in the art and forms no part of the present sulky apparatus invention 10 it is not described herein.

The sulky apparatus 10 is constructed of conventional materials known in the sulky apparatus construction art. The manufacturing techniques used in manufacturing the sulky apparatus 10 including those used in cutting, drilling, milling, tapping and welding are all common and well known in the sulky manufacturing art.

Although the invention has been described in considerable detail with reference to a certain preferred embodiment, it will be understood that variations or modifications may be made within the spirit and scope of the invention as defined in the appended claims.

What is claimed is:

1. Sulky apparatus for use behind a self-propelled operator controlled machine comprising an operator standing platform, a wheel rim and tire for allowing the operator standing platform to move along the ground, a wheel well having a top associated with the operator standing platform for housing the wheel rim and tire in an operational position and wheel rim and tire removal means for permitting the wheel rim and tire to be removed from the top of the wheel well, the wheel rim and tire removal means for permitting the wheel rim and tire to be removed from the top of the wheel well also including locking means for locking the wheel rim and tire in the wheel well, and a wheel cover located to cover the wheel well and wherein the wheel cover has means for permitting the wheel cover to be opened to gain access to the wheel well.

2. The sulky apparatus of claim 1 wherein the means for permitting the wheel cover to be opened to gain access to the wheel well comprises means for permitting the wheel cover to pivot to an open position.

3. The sulky apparatus of claim 2 further comprising wheel cover locking means for locking the wheel cover in the closed position.

4. The sulky apparatus of claim 3 wherein the wheel cover allows the wheel rim and tire to be accessed without removing the tire from the wheel well.

5. The sulky apparatus of claim 4 wherein the wheel rim has end portions of an axle protruding therefrom.

6. The sulky apparatus of claim 5 wherein the axle end portions form part of the locking means for locking the wheel rim and tire in the wheel well.

7. The sulky apparatus of claim 6 wherein the locking means for locking the wheel rim and tire in the wheel well includes means for contacting the axle end portions.

* * * * *